May 21, 1963
U. W. P. ANDERS
3,090,421
FUEL SUPPLY SYSTEM FOR AN INTERNAL COMBUSTION ENGINE
Filed March 25, 1957
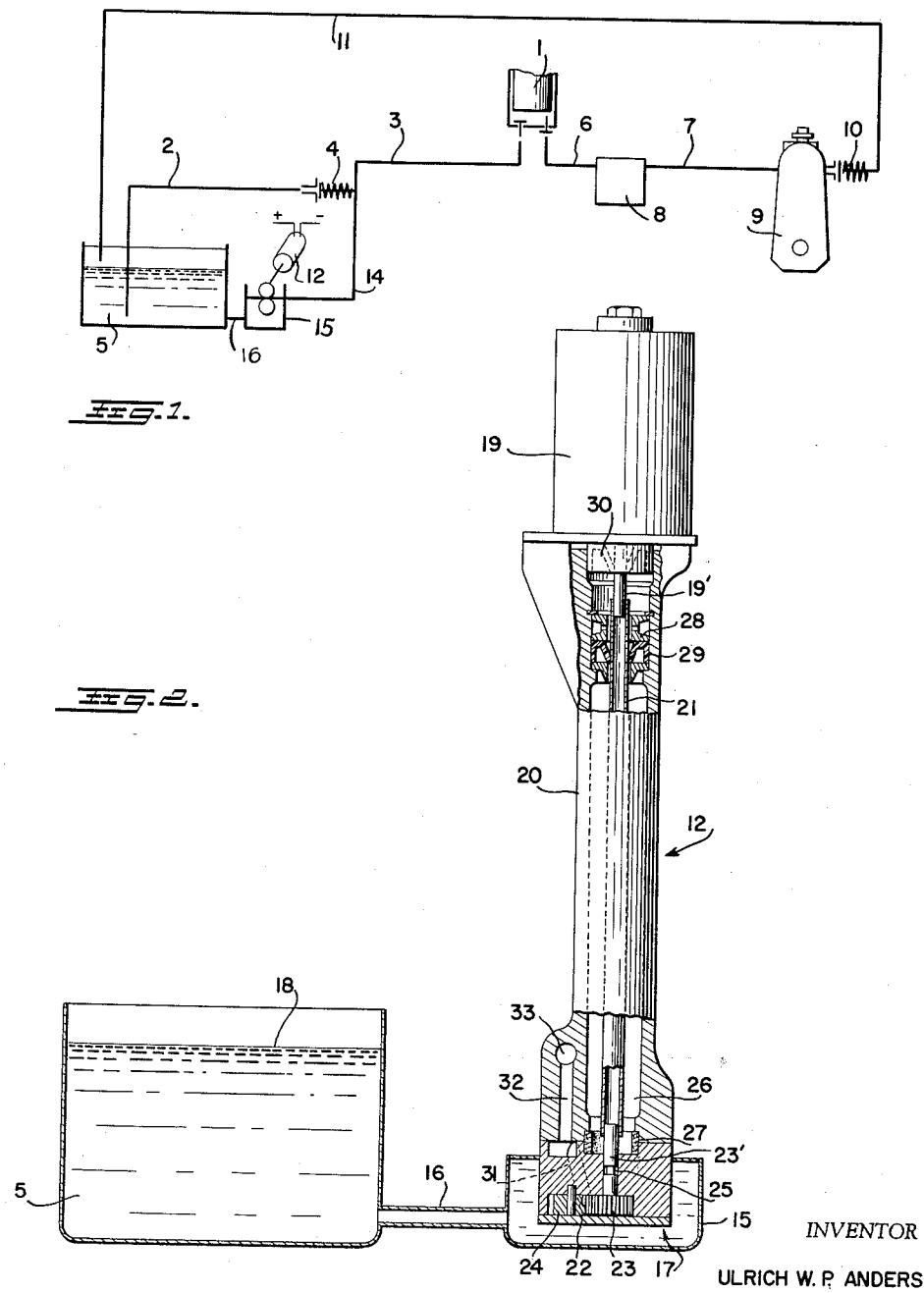
INVENTOR
ULRICH W. P. ANDERS
BY *Dicke and Craig*
ATTORNEYS United States Patent Office 3,090,421
Patented May 21, 1963

3,090,421
FUEL SUPPLY SYSTEM FOR AN INTERNAL COMBUSTION ENGINE
Ulrich W. P. Anders, Stuttgart-Unterturkheim, Germany, assignor to Daimler-Benz Aktiengesellschaft, Stuttgart-Unterturkheim, Germany
Filed Mar. 25, 1957, Ser. No. 648,071
Claims priority, application Germany Mar. 31, 1956
14 Claims. (Cl. 158—36.3)

The present invention relates to a fuel pump, and more particularly to an electrically driven booster pump for the fuel supply system of an internal combustion engine, preferably for an Otto-engine or spark ignition internal combustion engine. The fuel booster pump in accordance with the present invention is arranged additionally in a branch line between the fuel tank and the injection pump.

In internal combustion engines, which operate with fuel injection, and wherein the fuel is gasoline, a piston-type fuel pump is ordinarily provided ahead of the injection pump which fuel pump is driven by the engine and which normally assures a sufficient quantity of fuel for the injection pump throughout the entire range of the rotational speeds of the engine. However, it is appropriate if, in addition to the piston fuel pump which usually is located on the engine in direct proximity to the injection pump and which, as a result thereof, has to overcome the losses in relatively long suction paths from the fuel tank, an additional or auxiliary fuel booster pump is provided which is arranged in direct proximity of the fuel tank.

In contrast to the piston-type fuel pump ordinarily driven by the engine, the additional or auxiliary fuel pump is driven as a rule by an electric motor and is inserted into a branch line with respect to which the other branch portion of the suction line for the piston-type fuel pump is closed off by a check valve.

The additional or auxiliary fuel booster pump is engaged always when the supply capacity of the piston-type fuel pump becomes questionable. Consequently, the auxiliary electric fuel pump serves above all to assure an ample and satisfactory supply of fuel to the injection pump. Furthermore, the electric fuel booster pump is then engaged when the piston-type fuel supply pump is put out of operation. This engagement of the auxiliary electrically driven fuel booster pump takes place preferably automatically, and namely for the particular reasons of avoiding that air ever reaches the piston-type fuel pump.

In order to provide a particularly appropriate and advantageous construction and arrangement of the additional electrically driven fuel booster pump, the present invention proposes that the pump chamber of the booster pump be arranged below the level of the fuel and that the electric motor be arranged far above this level, and that both the booster pump and the electric motor be connected by a vertically or nearly vertically extending shaft. It is also appropriate to submerge the booster pump housing either into the main fuel tank or into an auxiliary tank arranged in direct proximity to the main fuel tank. The pump housing or body of the booster pump in accordance with the present invention is preferably connected with the electric motor by a hollow shaft suitably connected to the stub shafts of the pump and motor respectively. Such an arrangement of the additional fuel booster pump assures a safe supply of the fuel as in such an arrangement a suction or vacuum is only necessary to a relatively slight extent or not at all, and the fuel booster pump, therefore, operates exclusively as a pressure feed means.

Since the additional fuel booster pump is driven by an electric motor, the electric motor has to be carefully shielded and also sealed off with respect to the fuel for obvious safety reasons. For that reason, the electric motor is arranged far above the level of the fuel and is connected with the pump body by a long shaft. This long shaft is accommodated within a housing connecting the electric motor with the pump body. According to the well-known physical law applicable to tubes in communication with each other, the fuel tends to rise in the pump housing through any untight transition places up to the height of the fuel level in the tank. This, however, must be prevented by an appropriate arrangement. Consequently, according to a further feature in accordance with the present invention, it is proposed that a collecting space or chamber for the fuel which may have seeped through any possible leakage places, be arranged at the pump shaft above the pump chamber, which collecting space is connected by means of a by-pass channel with the suction space of the pump. The collecting space may be formed by a machined groove in the pump shaft. By the use of such an arrangement, the fuel which may seep through the various joints, notwithstanding the seals which may be provided, is drawn back into the pump space. In order to complete the sealing arrangement mentioned hereinabove, the drive shaft may be provided at the point of transition to the electric motor with an apertured seal and with a cup-type sealing ring arranged at least on one side of the apertured seal. It is also appropriate to provide the discharge aperture and connecting space for the further supply of the fuel at the fuel pump body above the normal fuel level in the tank, i.e., above the level of the fuel with an essentially full tank.

Accordingly, it is an object of the present invention to provide an arrangement for the fuel supply of an internal combustion engine with gasoline fuel injection such as an Otto-type engine, and more particularly to provide such an arrangement which assures continuous adequate fuel supply for the fuel injection pump at all times.

Still another object of the present invention is to provide an additional fuel booster pump so as to eliminate the drawbacks of the prior art experienced with an arrangement for an injection-type engine having only a piston-type fuel pump.

Still another object of the present invention is to provide reliable and safe operation of the fuel supply system for an Otto-type engine with fuel injection.

Still a further object of the present invention resides in the particular arrangement of the booster fuel pump which may be electrically driven and to the arrangement and connection of the electric drive motor and the booster pump.

A still further object of the present invention is to provide an arrangement of the fuel booster pump which eliminates any drawbacks which may occur by reason of the fact that fuel may seep and leak through untight joints in the pump housing.

These and other objects, features and advantages of the present invention will become more obvious from the following description when taken in connection with the accompanying drawing, which shows, for purposes of illustration only, one preferred embodiment in accordance with the present invention and wherein:

FIGURE 1 is a schematic diagram of the circulation system for the fuel supply of an internal combustion engine with an injection pump, and FIGURE 2 shows on an enlarged scale the additional electrically driven fuel booster pump in accordance with the present invention in connection with the fuel tank of the vehicle.

Referring now to the drawing wherein like reference numerals are used throughout the two views to designate like parts and more particularly to FIGURE 1, reference numeral 1 designates the piston-type fuel pump by means of which the fuel is drawn or sucked in and supplied to the injection pump in the usual manner over line sections 2 and 3 and check valve 4 from the tank 5. The piston-type fuel pump 1 which is driven by the engine supplies the fuel over the line sections 6 and 7 and the filter 8 inserted therebetween to the injection pump 9. If the pressure exceeds the safe pressure for the injection pump 9, then fuel is carried off or discharged for purposes of equalization, which takes place over the pressure relief valve 10 and the discharge line 11 returning the excess fuel to the tank 5.

For example, during standstill of the internal combustion engine, in order to prevent any interruption of the fuel supply in the line system, the electric fuel pump 12, by conventional means not forming part of the present invention and hence not shown, is automatically engaged which forces fuel to the piston-type fuel pump 1 and to the injection pump 9 over the line sections 16, 14 and 3 as well as over the lines 6 and 7 whereby the excess fuel is returned from the injection pump 9 over the line 11 back to the tank 5. Upon engagement of the additional electric fuel booster pump, the check valve 4 is automatically closed and therewith a direct return flow of the fuel over the line section 2 into the tank 5 is prevented. The electric fuel pump 12 may also be engaged if the piston fuel pump 1 operates inadequately.

FIGURE 2 shows in further detail the immediate arrangement of the additional electric fuel booster pump 12 in direct proximity of the fuel tank 5. Adjacent the fuel tank 5 a small auxiliary tank 15 is provided in one embodiment according to the present invention which is connected with the main fuel tank 5 by a short line section 16. The pump body, generally designated by reference numeral 17, of the electrically driven fuel booster pump 12 dips into or is submerged in the auxiliary tank 15 so that it is located below the normal fuel level 18 with an essentially full tank. A vertical shaft 21 is provided within the housing 20 which connects the electric motor 19 with the pump 17 which shaft 21 transmits the rotations of the electric motor 19 to the gear 23 of the pump 17. It is essential that the electric motor 19 be arranged as far above the fuel tank as possible. The toothed gears 23 and 24 are arranged in the pump chamber 22. An annular groove 25 is provided in the stub shaft 23' of the gear 23 by a reduction in diameter in the stub shaft 23' which may be readily machined therein. The groove 25 serves as collecting space for the seepage and leakage fuel. The annular groove 25 is connected by means of a channel (not shown) with the suction space of the pump chamber 22 whereby any fuel due to leakage or seepage is drawn back into the pump chamber 22. The shaft 21 which may be secured to the stub shafts 23' and 19' of the pump gear 23 and of the electric motor 19, respectively, in any suitable manner, may be made of high grade non-corrosive metal.

Furthermore, a vacuum may also be provided in the space 26, if so desired. This may be done in any conventional manner. The space 26 is sealed by means of seal or packing 27. A further sealing arrangement is provided in direct proximity of the electric motor 19 which is obtained by the apertured seal 28 and cup-type sealing ring 29 made of suitable plastic material, such as neoprene or the like. Directly below the electric motor 19 a second cup-type sealing ring 30 also made of plastic material and similar to ring 29 is provided.

The fuel supplied by the electrically driven booster fuel pump 17, illustrated in FIGURE 2, is supplied by the pump through bores 31, 32 and 33 and leaves the pump housing at the height of the channel 33. Appropriately, a flange for connecting a supply line may be provided in the pump body 17 at the discharge aperture of the channel 33.

While I have shown and described one preferred embodiment in accordance with the present invention, it is understood that the same is not limited thereto but is susceptible of many changes and modifications within the spirit of the present invention and I intend to cover all such changes and modifications as encompassed by the appended claims.

I claim:

1. A fuel supply system for an internal combustion engine comprising an injection pump, a main fuel tank, a suction line including an engine driven fuel pump interconnecting said main fuel tank and said injection pump, an auxiliary fuel tank, suction line means interconnecting said main fuel tank and said auxiliary tank, a booster pump including a pump body, movable pump means within said pump body, said pump body being disposed in said auxiliary fuel tank and said movable pump means being submerged below the normal fuel level in said main fuel tank, line means connecting said pump body and said suction line, means for driving said movable pump means including an electric motor, and means furnishing protection against the danger of fuel ignition by sparks from said electric motor comprising elongated housing means disposed in a lengthwise upwardly extending position, said housing means having upper and lower end portions, said lower end portion being joined to said pump body and said upper end portion being joined to said electric motor, said elongated housing means being disposed in a position above said auxiliary fuel tank and remotely spacing said electric motor from said auxiliary fuel tank.

2. A fuel supply system according to claim 1, wherein said means for driving said movable pump means comprises shaft means drivingly connecting said electric motor and said movable means, said shaft means comprising a tubular shaft.

3. A fuel supply system according to claim 1, wherein said means for driving said movable pump means comprises shaft means drivingly connecting said electric motor and said movable means, said means furnishing protection further comprising seal means for sealing said shaft means with respect to said electric motor.

4. A fuel supply system according to claim 3, wherein said seal means includes an apertured seal and a seal ring disposed at least on one side of the booster pump.

5. A fuel supply system for an internal combustion engine comprising an injection pump, a main fuel tank, and a fuel line including a fuel pump for supplying fuel from said main fuel tank to said injection pump, an auxiliary fuel tank, suction line means interconnecting said main fuel tank and said auxiliary fuel tank, a booster pump comprising a pump body including a chamber and movable pump elements in said chamber, said pump body being disposed in said auxiliary tank at an elevation below the normal fuel level in said main fuel tank, line means connecting said pump body and said fuel line, means including an electric motor for driving said movable pump elements, means for supporting said electric motor in a position remote from said auxiliary tank comprising an elongated housing interconnecting said electric motor and said pump body, said elongated housing being disposed in a length-wise, upwardly extending position, the lowermost portion of said elongated housing being disposed above said auxiliary tank and the uppermost portion of said housing being connected to said electric motor, space above said chamber to collect therein the leakage fuel, and by-pass means connecting said collecting space with the suction side of said booster pump.

6. A fuel supply system according to claim 5, wherein said means including said electric motor for driving said pump elements further includes an essentially vertical shaft operatively connected with said electric motor and with said movable pump elements, seal means including an apertured seal and cup-type seal rings on each side of said apertured seal for sealing said shaft with respect to said electric motor.

7. A fuel supply system according to claim 5, wherein said line means comprises a discharge aperture in said elongated housing disposed above said auxiliary tank.

8. A fuel supply system according to claim 1, wherein said means furnishing protection comprises closure means for the top of said auxiliary tank.

9. A fuel supply system for an internal combustion engine comprising an injection pump, a main fuel tank and an engine-driven fuel pump operatively connected to said main fuel tank to supply fuel to said injection pump, an auxiliary fuel tank connected with said main fuel tank and disposed in a position spaced below a level defined by the normal fuel level in said main fuel tank, a booster pump operatively connected with said engine driven fuel pump to supply fuel when the fuel supply of said engine driven fuel pump becomes inadequate, said booster pump comprising a pump body including a pump chamber and pump means arranged therein, a portion of said booster pump body including said pump chamber and said pump means being disposed within said auxiliary fuel tank, means for driving said pump means including an electric motor, means providing protection against the danger of fuel ignition by sparks from said electric motor comprising an elongated housing disposed in a lengthwise upwardly extending position, said elongated housing having a lower end portion in juncture with said pump body and having an upper end portion connected to said electric motor, said elongated housing being disposed in a position above said auxiliary fuel tank, said means for driving said pump means including shaft means journaled in said pump body drivingly connecting said electric motor with said pump means, and seal means for said shaft means.

10. A fuel supply system according to claim 9, further comprising a collecting space above said pump chamber to collect therein the leakage fuel.

11. A fuel supply system according to claim 10, wherein said shaft means includes means forming said collecting space above said pump chamber.

12. A fuel supply system according to claim 10, wherein said auxiliary fuel tank includes cover means adapted for closing said auxiliary fuel tank on top thereof, said pump body projecting above said cover means.

13. A fuel supply system according to claim 9, wherein said pump means comprises a gear pump.

14. A fuel supply system according to claim 9, wherein said seal means includes an apertured seal and cup-type seal rings on each side of said apertured seal for sealing said shaft means with respect to said electric motor.

References Cited in the file of this patent

UNITED STATES PATENTS

| | | |
|---|---|---|
| 1,386,304 | Barnickol et al. | Aug. 2, 1921 |
| 1,577,622 | Gaston | Mar. 23, 1926 |
| 1,595,779 | Hartzell | Aug. 10, 1926 |
| 1,739,803 | Schlegel et al. | Dec. 17, 1929 |
| 1,866,064 | Stratford | July 5, 1932 |
| 1,875,398 | Teesdale et al. | Sept. 6, 1932 |
| 2,312,525 | Curtis | Mar. 2, 1943 |
| 2,330,718 | Harlow | Sept. 28, 1943 |
| 2,357,174 | Curtis | Aug. 29, 1944 |
| 2,394,154 | Curtis et al. | Feb. 5, 1946 |
| 2,599,699 | Dilworth et al. | June 10, 1952 |
| 2,640,318 | Carey | June 2, 1953 |
| 2,675,828 | Booth | Apr. 20, 1954 |
| 2,706,888 | Ballantyne et al. | Apr. 26, 1955 |
| 2,723,529 | Hazen | Nov. 15, 1955 |
| 2,764,943 | Peters | Oct. 2, 1956 |

FOREIGN PATENTS

| | | |
|---|---|---|
| 509,690 | Canada | Feb. 1, 1955 |